United States Patent [19]

Currie et al.

[11] 4,156,971

[45] Jun. 5, 1979

[54] CONTOUR MEASUREMENT SYSTEM

[75] Inventors: James R. Currie; Ralph R. Kissel; Emsley T. Deaton, Jr.; Richard A. Campbell, all of Huntsville, Ala.

[73] Assignee: The United States of America as represented by the Administrator of the National Aeronautics and Space Administration, Washington, D.C.

[21] Appl. No.: 848,418

[22] Filed: Nov. 3, 1977

[51] Int. Cl.² .......................... G01B 5/24; G01B 7/30; E21C 35/08

[52] U.S. Cl. .................................. 33/174 L; 33/1 Q; 33/1 N; 105/161; 299/1; 364/560

[58] Field of Search ............ 33/1 H, 1 N, 1 Q, 174 R, 33/174 L, 174 P, 174 PA, 175; 105/161; 299/1; 235/92 DN, 92 MT; 364/560, 564

[56] References Cited

U.S. PATENT DOCUMENTS

| 2,966,743 | 1/1961 | Doudlah | 33/1 N |
| 3,345,746 | 10/1967 | Plasser et al. | 33/1 Q |
| 3,470,739 | 10/1969 | Takafuji et al. | 33/174 P |
| 3,571,937 | 3/1971 | Sears | 33/1 H |
| 3,606,687 | 9/1971 | Richardson | 33/174 L |

FOREIGN PATENT DOCUMENTS 1270513  6/1968  Fed. Rep. of Germany .............. 299/1

Primary Examiner—Richard R. Stearns
Attorney, Agent, or Firm—George J. Porter; John R. Manning; L. D. Wofford, Jr.

[57] ABSTRACT

A measurement system for measuring the departures from a straight line of discrete track sections of a track along a coal face in a mine employing a vehicle having a pair of spaced wheel assemblies which align with the track. A reference arm pivotally connects between the wheel assemblies, and there is indicating means for measuring the angle of pivot between the arm and each of the wheel assemblies. The length of the device is less than the length of a track section, and thus when one of the wheel assemblies is on one track section and one is on an adjoining track section, the sum of the indicated angles will be indicative of the angle between track sections. Thus, from the length of a track section and angle, the departure of each track section from the line may be calculated.

5 Claims, 5 Drawing Figures

CONTOUR MEASUREMENT SYSTEM

ORIGIN OF THE INVENTION

The invention described herein was made by employees of the United States Government, and may be manufactured and used by or for the Government of the United States for governmental purposes without the payment of any royalties thereon or therefor.

BACKGROUND OF THE INVENTION

1. Field of the Invention

This invention relates to yaw measurement devices, that is, devices which measure the deviation of a body from a straight line, and particularly to a system which measures the departure from a straight line of track sections of a track extending through a shaft in a mine.

2. General Description of the Prior Art

The most modern approach to coal mining is longwall mining. In longwall mining, the area to be mined is divided into blocks, perhaps 900 feet across and 5,000 feet long. Two access tunnels are drilled on either side of a block, and a face tunnel is cut between access tunnels at the end of a block. A track for a longwall coal cutting machine, or a longwall shearer, is laid through the face tunnel in a manner that enables the material to be mined and dumped on a moving conveyor which transfers it to one of the access tunnels for removal. The ceiling along the coal face is held up by hydraulic supports that are moved forward after each cut. After the supports are advanced, the ceiling behind the supports falls in. Stresses in the mine roof are critical. If the face becomes bowed, forces in the mine will become excessively unbalanced, and the ceiling sometimes will fall in on the machine. Even if this does not occur, it is possible that the track will lock up because of the forces. For this reason, the face yaw must be measured and controlled and individual track sections moved by adjusted amounts which will enable selected depths of cutting of the tunnel face to maintain an approximately straight line between the access tunnels.

In some longwall mines, visual techniques such as a light beam can be employed to measure deviation of a coal face from a straight line. In others where, for example, the coal seam is not level, and one cannot see from one end of a tunnel to the other, a typical method is to pull a string along the face of the mine and observe the yaw of the mine face from the string. In any event, it appears that none of the prior art methods can be used in all mines, and all of the prior methods require turning off the mining machine while a measurement is being made, and none of these methods appear subject to automation.

SUMMARY OF THE INVENTION

In accordance with this invention, an angular measurement vehicle is constructed having two spaced track engaging assemblies and a reference arm interconnecting the assemblies. Angular measurement devices are separately employed to measure the pivot angle between each track engaging assembly and the reference arm and the thus measured angles summed. From this data and the length of a track section, the path of the track as a whole and its departure from a straight line may be determined. From this information, hydraulic cylinders which advance individual track sections may be selectively moved to make corrections in the track to thereby maintain the track along the selected line.

DETAILED DESCRIPTION OF THE DRAWINGS

Figure 1:
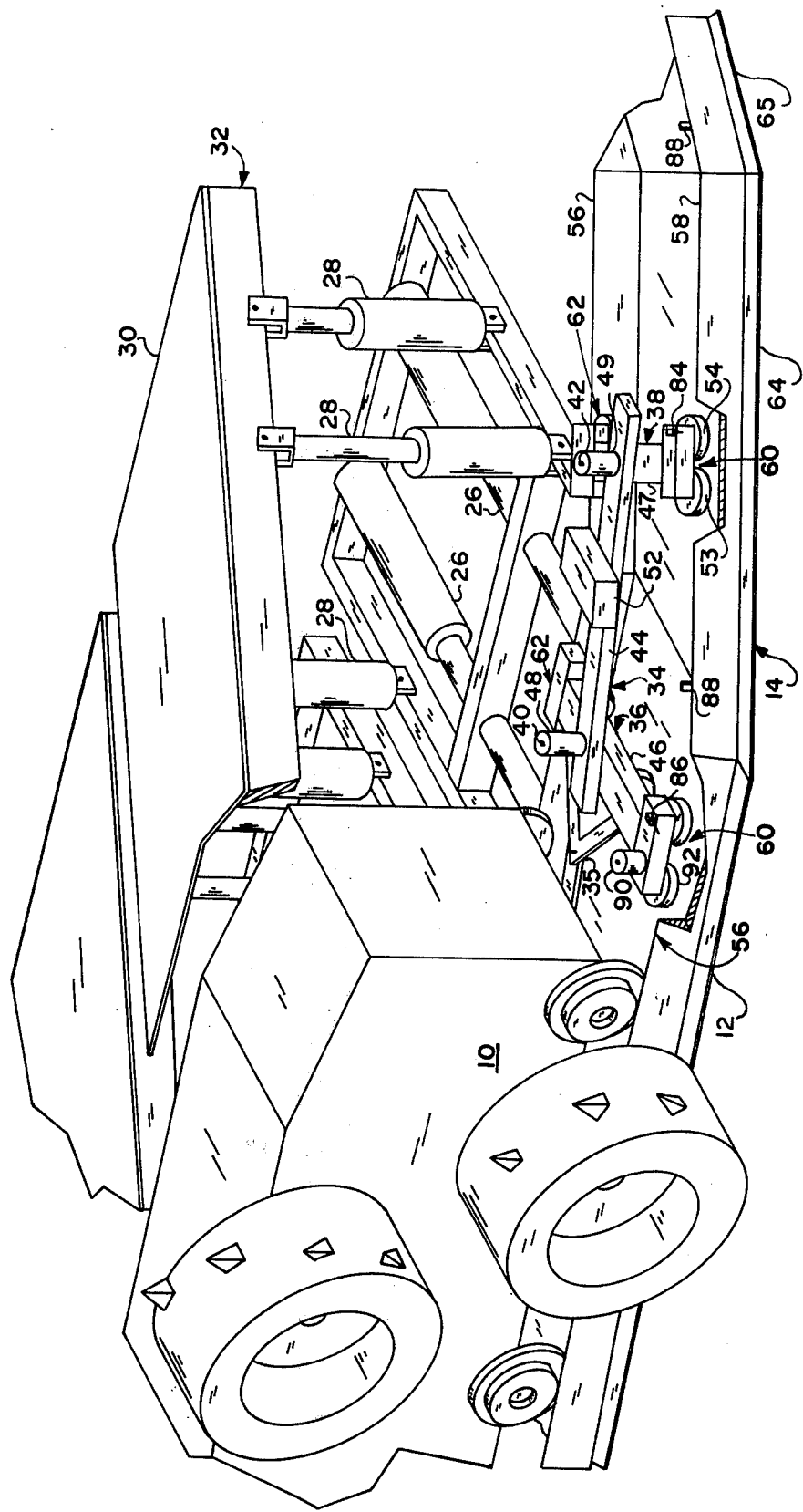
FIG. 1 is a pictorial view illustrating a longwall mining system and a simplified version of an angular measurement vehicle adapted to be moved along the track with the mining machine of the system.
Figure 2:
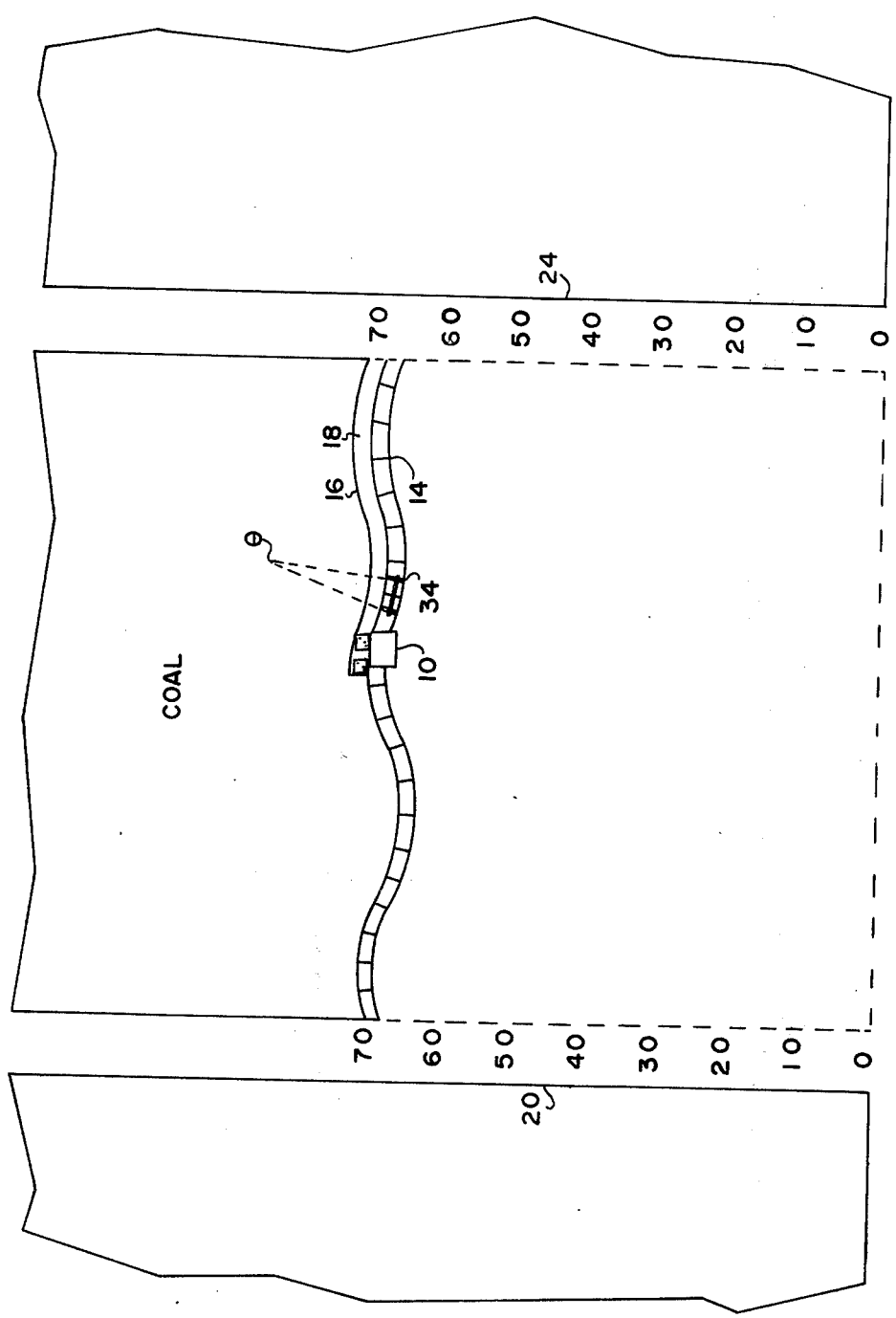
FIG. 2 is a schematic illustration of the position of a track in a face tunnel between base or access tunnels in a mine.

Referring to FIG. 1, longwall mining machine 10 is operated on track section 12 of a length of track 14 shown in FIG. 2 as extending along a coal face 16 and within a face tunnel 18 extending between access tunnels 20 and 24. The longwall coal shearing system includes horizontally positioned hydraulic rams 26 which are employed to incrementally advance track 14 forward as coal cuts are made and vertical hydraulic rams 28 which support roof sections 30 which extend over and protect longwall coal shearing machine 10 and track 14. There is also included associated frame members 32 which directly support the roof members and generally connect the support system together.

As shown, and by way of illustration only, angular measurement vehicle 34 is towed by mining machine 10 via coupling means 35. Vehicle 34 employs a pair of identical track engaging wheel assemblies 36 and 38 pivotally connected by pivoting shafts 40 and 42 to a connecting reference arm member 44. Thus, shafts 40 and 42 indicate the rotation of cross arms 46 and 47 of the wheel assemblies with respect to reference arm member 44, and this rotation is detected by resolvers 48 and 49, schematically illustrated as being positioned around shafts 40 and 42. As an example, the resolvers would have rotor members affixed on shafts 40 and 42 and stator members fastened to reference arm 44. Enclosure 52, shown positioned on reference arm 44, would include such local electronic circuitry as needed to obtain data from resolvers 48 and 49 and distance encoder 90 (to be described) and supply the data to an operating position by a communications link (not shown). As a means of accurately referencing the line of direction of track 14, wheel pairs 60 and 62 are positioned at each end of cross arms 46 and 47, and each of the wheel pairs includes two wheels which have outer peripheral contact points 53 amd 54 which are of equal distance from the center of pivoting shafts 40 and 42. Thus, each of the wheel assemblies engages a rail, either a rail 56 or rail 58 of track 14, and thus maintains a center line extending through a center shaft, 40 or 42, and centrally between wheel assemblies 60 and 62 and precisely normal to the longitudinal direction of track 14. Thus, as shown, cross arm 46 would be in register with track section 12, and cross arm 47 would be in register with track section 64. The angle that each of the cross arms would form with reference arm 44 would be provided as an output of a resolver, and thus resolver 48 would provide, for example, a first output indicative of angle $\theta_r$ between cross arm 46 and reference arm 44, and resolver 49 would provide as an output an output representative of angle $\theta_r$ between cross arm 47 and reference arm 44. The sum of the angles $\theta$ represented by these two outputs, which may be regarded as a third output, would be representative of the angle between track sections 12 and 14.

Figure 3:
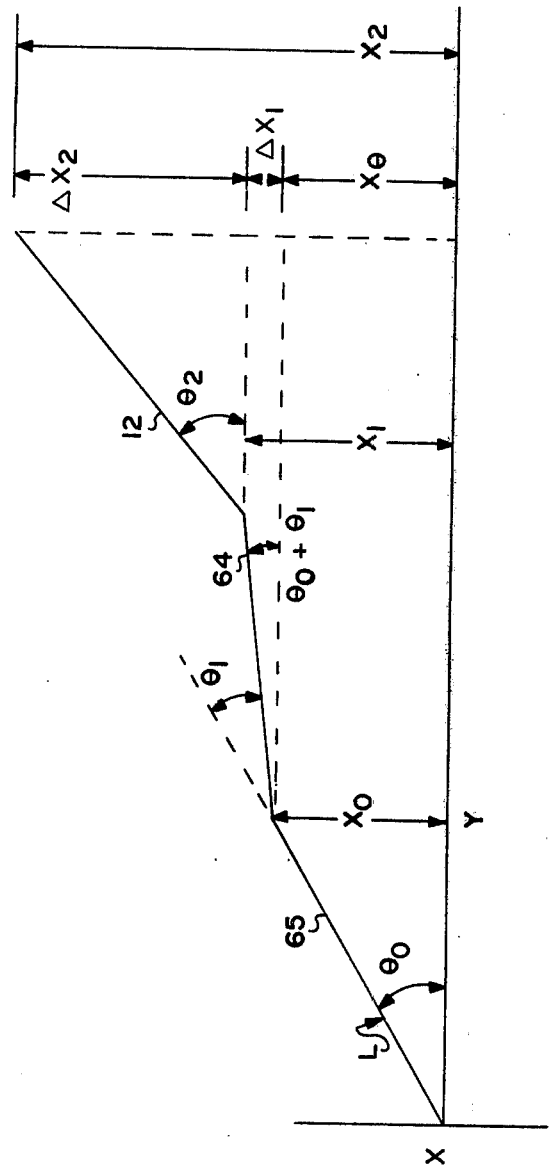
FIG. 3 is a graphical illustration of the angular measurements made in the departure of each track section from a reference line.

Referring next to FIG. 3, the Y axis would be regarded as perpendicular to tunnels and the X axis as displacement along a tunnel. The straight line sections L represent track sections. Each track section is normally five feet long, and, as described above, a number of these sections are placed together to form a long track having angles $\theta_{0, 1, n-1}$ between sections. This figure illustrates the manner in which the displacement X of each track section from the X axis is obtained. To accomplish this, there must be determined the initial angle $\theta_0$ of the first track section along the tunnel with respect to a line and angles $\theta_{n-1}$ between track sections extending from and beyond the first track section. The displacement of the first section 65 is defined as $X_0$ and mathematically is simply $X_0 = L \sin \theta_0$; the second section 64 is $X_1 = X_0 + L \sin (\theta_0 + \theta_1)$; the third section 12 is $X_2 = X_1 + L \sin (\theta_0 + \theta_1 + \theta_2)$; and the last section (not shown) would be $X_n = X(n-1) + L \sin [\theta_0 + \theta_1 + \cdots \theta_{(n-1)} + \theta_n]$.

One of the major problems in the face measurement is finding the angle $\theta_0$. Normally, this would require some manual alignment scheme that would consume considerable time in the automation of the longwall machine. However, noting from FIG. 2 that there are survey markers along each tunnel as reference points, these markers may be used to find the relative location of a mine face beginning and end points. Since the beginning and end points should track fairly well over a 30 to 40-foot face advancement, this data is only required periodically.

Figure 4:
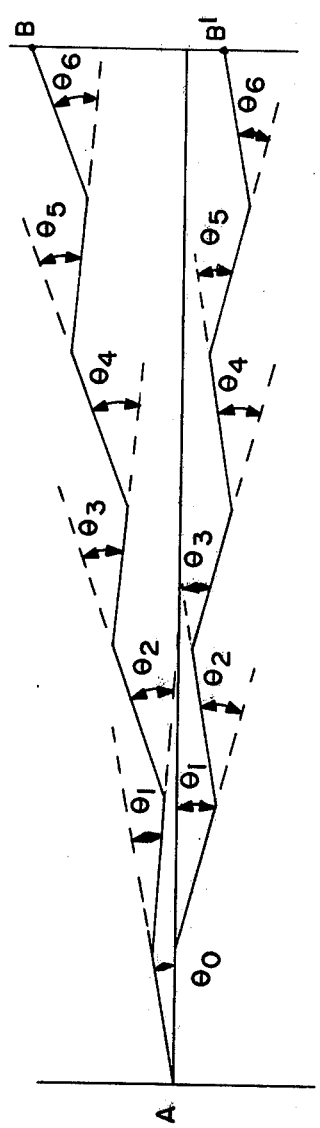
FIG. 4 is a graphical illustration of the angular measurements made and their use in determining a final plot of a track between survey points of tunnels between which a track is laid.

Referring now to FIG. 4, the method for determing $\theta_0$ will be described. Point A is the known beginning of the track section, and point B is the end of the track section. Angles $\theta_1$ through $\theta_6$ are accurately measured and stored. Since the angle $\theta_0$ is not measured, it is initially assumed to be 0°. The displacement of each section is calculated to find end point $B^1$. Since $B^1$ did not fall on B, displacement between B and $B^1$, or error, is attributed to the initial angle $\theta_0$ which is $$\theta_0 = \sin^{-1} d/L(n+1)$$

where "d" is the displacement $B-B^1$, L is the length of each section, and $(n+1)$ is the total number of sections. $\theta_0$ is added to all angle measurements and the displacements recalculated. The end points will fall exactly on A and B, giving the profile of the coal face.

The foregoing theory works only when the angle between the sections are accurately measured, as is accomplished by the system of this invention.

Figure 5:
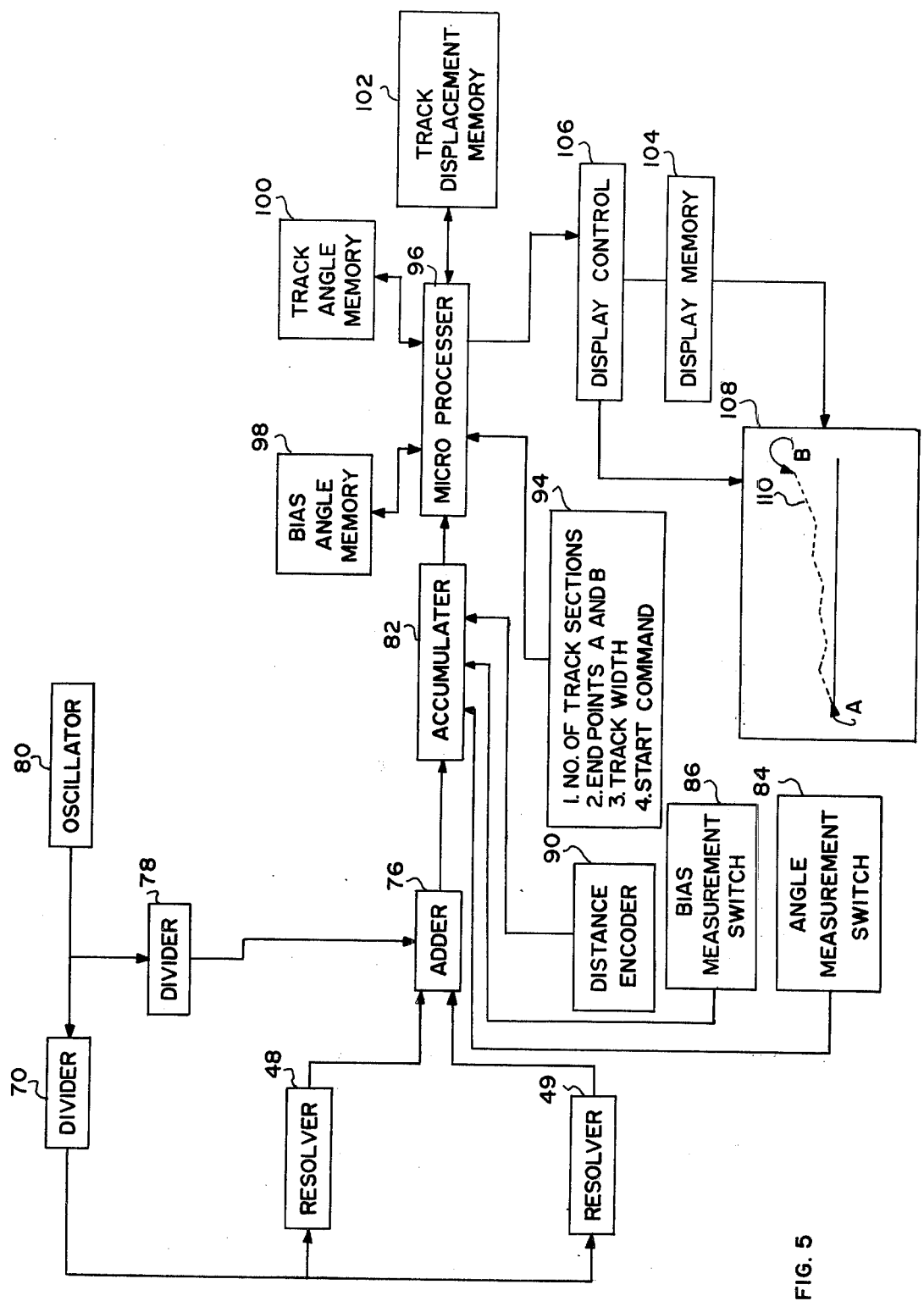
FIG. 5 is a block diagram broadly illustrating an electronic system for performing the computations required to determine an actual plot of the position of a track and to display this plot.

While the invention as thus far described provides only the necessary data to effect changes in the advance of track sections to effect corrections of the track so that coal may cut to effect a straight face cut, it will be appreciated that further processing of data will enable it to be used more effectively. Thus, as shown in FIG. 5, an electronic system is shown which processes the data to provide an actual plot of the position of a track with respect to a projected reference and be displayed as on a cathode ray tube or strip chart. Referring to this system, a 1.8 MHz oscillator provides a reference frequency which is divided by divider 70 by 4,500, and it provides a 400 Hz signal to forward resolver 48 and rear resolver 49 which modulate this signal to provide outputs representative of $\theta_f$ and $\theta_r$ to adder 76, to which is also supplied a keying signal of 0.9 MHz obtained through divide-by-2 divider 78 from oscillator 80. The output of adder 76 is fed to 200 sample accumulator 82 which identifies and stores outputs responsive to the operation of an angle measurement switch 84 on vehicle 34 as vehicle 34 traverses one foot. Switch 84 is operated when it contacts tab 88 on a track section, and this flushes a track angle shift register of accumulator 82 which then is supplied 200 pulses per foot of travel from distance encoder 90 (such as an optical encoder), coupled one to one, to wheel 92 of wheel assembly 36. During this encoding count of 200 pulses, accumulator 82 stores 200 samples of track angle $\theta$. Subsequently, when vehicle 34 has advanced to a point where bias switch 86 is operated by tab 88, it flushes a bias angle shift register in accumulator 82, which then receives 200 pulses per feet of travel of vehicle 34 from encoder 90, and this causes 200 samples of bias angle $\theta_b$ to be stored in accumulator 82. Additionally, encoder 90 functions as a source of signals for distance encoding, which would simply be in the form of a counter in which 200 counts represents one foot of travel along track 14. Thus, track angle data is readily referenced to the track section involved.

To examine operation, coal cutting or shearing machine 10 would be operated across coal face 16 (FIG. 2), and while it is making a cut, data from resolvers 48 and 49 relating to the orientation of sections of track 12 and 64 will be fed to adder 76, and the output of adder 76 would provide an encoded angle to accumulator 82 where angles would be stored in terms of there being an angle measurement or a bias measurement and in terms of encoded position along track 14.

In order to enable a plot of the data stored in accumulator 82 with respect to locations A and B in tunnels 1 and 2, a position coordinate encoder (not shown) of computer interface unit 94 encodes and provides to microprocessor 96 encoded data representative of these coordinates. As further inputs to microprocessor 96, interface unit 94 provides signals representative of the total number of sections of track and the length of a track section, in this case, being five feet.

To process data, microprocessor 96 would be programmed to function as follows:

1. Enter bias angle and track section angle measurements into memories 98 and 100, respectively.
2. Stop entering data when n sections have been reached.
3. Add all bias angles together.
4. Find the average bias angle as follows:

$$\theta_{bias} = \Sigma \theta_b / n - 1$$

5. Subtract $\theta_{bias}$ from all track section angles and store information in track section angle memory 100.
6. Find the angle $\alpha$ of each section with respect to the first section and assume:

$$\alpha_0 = 0$$

$$a_n\theta_0+\theta_1+\ldots\theta_{(n-1)}+\theta_n$$

Store this information in bias angle memory 98.

7. Calculate the coal face displacement $X_n$ and store in track displacement memory 102 as follows:

$$X_n = 5\sin a_n + X_{n-1}$$

8. Calculate where the end point should be:

$$X_{true} = B - A$$

9. Solve for the last section displacement error:

$$d = X_{true} - X_n$$

10. Calculate $a_0$ where:

$$a_0 = \sin^{-1} D/5n$$

11. Add $a_0$ to all angles and store in memory 100.

12. Calculate the coal face displacement and store in memory 102 wherein:

$$X_n = 5\sin a_n + X_{n-1}$$

13. Transfer $X_n$ to display panel memory 104 through display control 106. Stop.

With the data included in display memory 104, by operation of display control 106, the data may then be conventionally displayed on cathode ray display 108 as illustrated wherein a track would have been found to have the yaw indicated by curve 110, extending between indicated locations A and B, representative of locations in tunnels 1 and 2 of FIG. 4.

Having thus described our invention, what is claimed is:

1. A measurement system for measuring a contour comprising:
    a track comprising a plurality of straight track sections of equal length pivotally interconnected to extend continuously between two points;
    a vehicle including wheel means engaging the track to enable the vehicle to traverse the composite length of said track, and including:
        first and second, longitudinally spaced along said track, track followers, and a reference arm interconnecting said track followers, each track follower being adapted to contact and align with a different one of said track sections, and
        angular detection means coupled between said first and second track followers for providing as an output a signal representative of the sum of the angles between said reference arm and said track followers; and
    position detection means for providing a position identifying output signal of a position of said vehicle along said inteconnected tracks, and including means for providing at least one such position identifying signal when said first track follower is in engagement with one said track, and said second track follower is in engagement with an adjoining said track, whereby at least one output of said angular detection means may be identified as being representative of the angle between each pair of adjoining said tracks.

2. A measurement system as set forth in claim 1 wherein each said track comprises a pair of spaced rails, and each said track follower comprises:
    a cross arm generally extending normal to and between rails; and
    alignment means supported by said cross arm on each end of said cross arm for engaging each said rail along a line normal to said cross arm, whereby said cross arm is maintained in a position normal to said rails as said vehicle is moved along said connected tracks.

3. A measurement system as set forth in claim 2 wherein said angular detection means comprises:
    first angular detection means coupling one end of said reference arm to said first track follower, and providing a first electrical output indicative of the angle between said reference arm and said first track follower;
    second angular detection means coupling an opposite end of said reference arm to said second track follower, and providing a second electrical output indicative of the angle between said reference arm and said second track follower; and
    summing means responsive to said first and second electrical outputs for providing a third electrical output representative of said sum of the angles between said reference arm and said track followers.

4. A measurement system as set forth in claim 3 wherein said position detection means further comprises means for providing at least one position identifying signal when both said first and second track followers are in engagement with one of said track sections.

5. A measurement system as set forth in claim 4 wherein said position detection means is operable for a discrete distance of travel of said vehicle, and said angular detection means comprises means for providing as an output a plurality of signals representative of said sums of said angle.

* * * * *